US009188979B2

(12) United States Patent
Torti et al.

(10) Patent No.: US 9,188,979 B2
(45) Date of Patent: Nov. 17, 2015

(54) METHOD AND SYSTEM FOR REMOTELY CONTROLLING A VEHICLE

(71) Applicant: Lockheed Martin Corporation, Bethesda, MD (US)

(72) Inventors: Russell Guy Torti, Southlake, TX (US); James R. Reed, Azle, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 214 days.

(21) Appl. No.: 13/959,796

(22) Filed: Aug. 6, 2013

(65) Prior Publication Data
US 2015/0046017 A1   Feb. 12, 2015

(51) Int. Cl.
*G01S 19/21* (2010.01)
*G01S 19/26* (2010.01)
*G01S 19/20* (2010.01)
(Continued)

(52) U.S. Cl.
CPC .............. *G05D 1/0011* (2013.01); *G01C 21/10* (2013.01); *G01C 21/16* (2013.01); *G01C 21/165* (2013.01); *G01S 19/21* (2013.01); *G01S 19/215* (2013.01); *G01S 19/48* (2013.01); *G05D 1/0077* (2013.01); *G01C 21/00* (2013.01); *G01S 19/13* (2013.01); *G05D 1/00* (2013.01); *G05D 1/0055* (2013.01)

(58) Field of Classification Search
CPC ..... G05D 1/0011; G05D 1/0077; G05D 1/00; G05D 1/0055; G01S 19/215; G01S 19/21; G01S 19/13; G01S 19/26; G01C 21/165; G01C 21/16; G01C 21/10; G01C 21/00

USPC .......... 701/25, 408, 468, 469, 474, 475, 476, 701/472; 702/141; 342/357.28, 357.25, 342/357.21, 357.22, 357.65, 357.71; 380/258
See application file for complete search history.

(56) References Cited

U.S. PATENT DOCUMENTS 5,757,916 A * 5/1998 MacDoran et al. ........... 380/258
6,677,900 B1    1/2004 Thouvenel et al.
(Continued)

FOREIGN PATENT DOCUMENTS

DE  102009016336 A1  10/2010
WO  2012120889 A1   10/2012

OTHER PUBLICATIONS

European Search Report for EP Application No. EP 14 18 0084, mailed on Apr. 1, 2015.

*Primary Examiner* — Russell Frejd
(74) *Attorney, Agent, or Firm* — Reising Ethington P.C.

(57) ABSTRACT

A method for determining the physical location of a vehicle being guided with an onboard navigational positioning system capable of detecting and generating a positioning location vector for the vehicle. The method includes the steps of detecting and receiving a plurality of electromagnetic radiation signals. A plurality of ambient parameter measurements is also received. A confirming location position is calculated from the plurality of electromagnetic radiation signals and the plurality of ambient parameter measurements. The confirming location position is compared to the positioning location vector generated by the onboard system to create a differential vector. If the confirmation location position and the positioning location vector are greater than a predetermined value, the positioning location vector generated by the onboard navigational positioning system is prevented from being used in directing the movement of the vehicle until the position differential is below a predetermined error value.

20 Claims, 3 Drawing Sheets

(51) Int. Cl.
*G01C 21/18* (2006.01)
*G05D 1/00* (2006.01)
*G01C 21/16* (2006.01)
*G01C 21/10* (2006.01)
*G01S 19/48* (2010.01)
*G01S 19/13* (2010.01)
*G01C 21/00* (2006.01)

(56) References Cited

U.S. PATENT DOCUMENTS

| | | | |
|---|---|---|---|
| 7,409,290 B2 * | 8/2008 | Lin | 701/470 |
| 7,532,895 B2 * | 5/2009 | Hrastar | 455/456.1 |
| 7,554,481 B2 * | 6/2009 | Cohen et al. | 342/14 |
| 8,203,486 B1 | 6/2012 | Smith | |
| 8,229,606 B2 * | 7/2012 | Vos et al. | 701/4 |
| 8,260,567 B1 * | 9/2012 | Kaplan | 702/142 |
| 8,296,051 B2 * | 10/2012 | Cohen et al. | 701/470 |
| 8,350,758 B1 | 1/2013 | Parvizi et al. | |
| 2002/0022927 A1 * | 2/2002 | Lemelson et al. | 701/301 |
| 2006/0074558 A1 * | 4/2006 | Williamson et al. | 701/213 |
| 2008/0091350 A1 | 4/2008 | Smith et al. | |
| 2011/0068973 A1 | 3/2011 | Humphreys et al. | |
| 2012/0268321 A1 | 10/2012 | Brekke | |

* cited by examiner

METHOD AND SYSTEM FOR REMOTELY CONTROLLING A VEHICLE

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND

1. Field

The invention relates to controlling a vehicle remotely. More particularly, the invention relates to a method and system for ensuring proper control of a vehicle while the vehicle is being operated in environments where standard positioning technology of the vehicle is unavailable and/or unreliable. The system will then remain in control until after it is confirmed that the normal positioning technology operation of the vehicle has been restored.

2. Description of Related Art Including Information Disclosed Under 37 CFR 1.97 and 1.98

Controls for vehicles are becoming more sophisticated and all encompassing as technology progresses. This circumstance is true regardless of whether the vehicle is a land vehicle, a watercraft or an aircraft. The ultimate in controls for a vehicle can be found the Unmanned Air Vehicles (UAVs). The UAVs are guided by telemetry and, as the name purports, they are unmanned. UAVs are often referred to as drones.

One problem associated with UAVs is the situation in which the control system for the UAV is inappropriately accessed and manipulated in order to control the system and/or operate in a manner that prevents it from completing its mission as planned. In some instances, the UAV will be instructed to land in hostile territory. In other situations, the UAV may identify a target that is not the designated target for the mission in which the UAV is operating. Generally, such "spoofing" occurs when counterfeit GPS signals are sent to the UAV causing it to steer off course or have it operate in a manner other than what was previously designated in its mission.

Therefore, there is a need in the art for a UAV, or other such vehicle, that is controlled remotely through telemetry to have a passive system that is capable of determining the true position of the vehicle and whether a portion of the control system has been compromised due to the receipt of counterfeit information, with the ability to collect that information prior to any action being taken on the host vehicle.

SUMMARY

A method for determining the physical location of a vehicle being guided with an onboard navigational positioning system capable of detecting and generating a positioning location vector for the vehicle. The method includes the steps of detecting and receiving a plurality of electromagnetic radiation signals. A plurality of ambient parameter measurements is also received. A confirming location position is calculated from the plurality of electromagnetic radiation signals and the plurality of ambient parameter measurements. The confirming location position is compared to the positioning location vector generated by the onboard system to create a differential vector. If the confirmation location position and the positioning location vector are greater than a predetermined value, the positioning location vector generated by the onboard navigational positioning system is prevented from being used in directing the movement of the vehicle until the position differential is below a predetermined error value.

DRAWING DESCRIPTIONS

These and other features and advantages will become apparent to those skilled in the art in connection with the following detailed description and drawings of one or more embodiments of the invention, in which.

DETAILED DESCRIPTION

Unmanned vehicles, aircraft and watercraft require accurate navigational systems in order for them to operate as designed. If the navigational systems fail, or if the navigational systems are interfered with and compromised, the host vehicle quickly becomes a liability because it will either be a participant in an accident or it will be retrieved by someone other than the owner.

A common example of an unmanned vehicle is an unmanned air vehicle (UAV), which is generally indicated at 10 in the Figures. The UAV 10 identifies its position with respect to the earth 12 using an onboard navigational positioning system, such as the global positioning system GPS, graphically represented by satellites 14. It should be appreciated by those skilled in the art that navigational positioning systems other than GPS may be used. And for purposes of simplicity, the navigational positioning system will be referred to hereinafter as the GPS.

The UAV 10 also receives commands from a ground command base 16. As one skilled in the art will appreciate, the UAV 10 is vulnerable should the GPS 14 provide inaccurate data or no data and when another ground base similar to the command ground base 16 transmits signals to the UAV 10 to effectively change the mission or direction of the UAV 10. In such situations, the UAV 10 may be directed to land in a hostile territory or it may deploy its payload at a "spoofed" target other than the designated target for the mission of the UAV 10.

Figure 2:
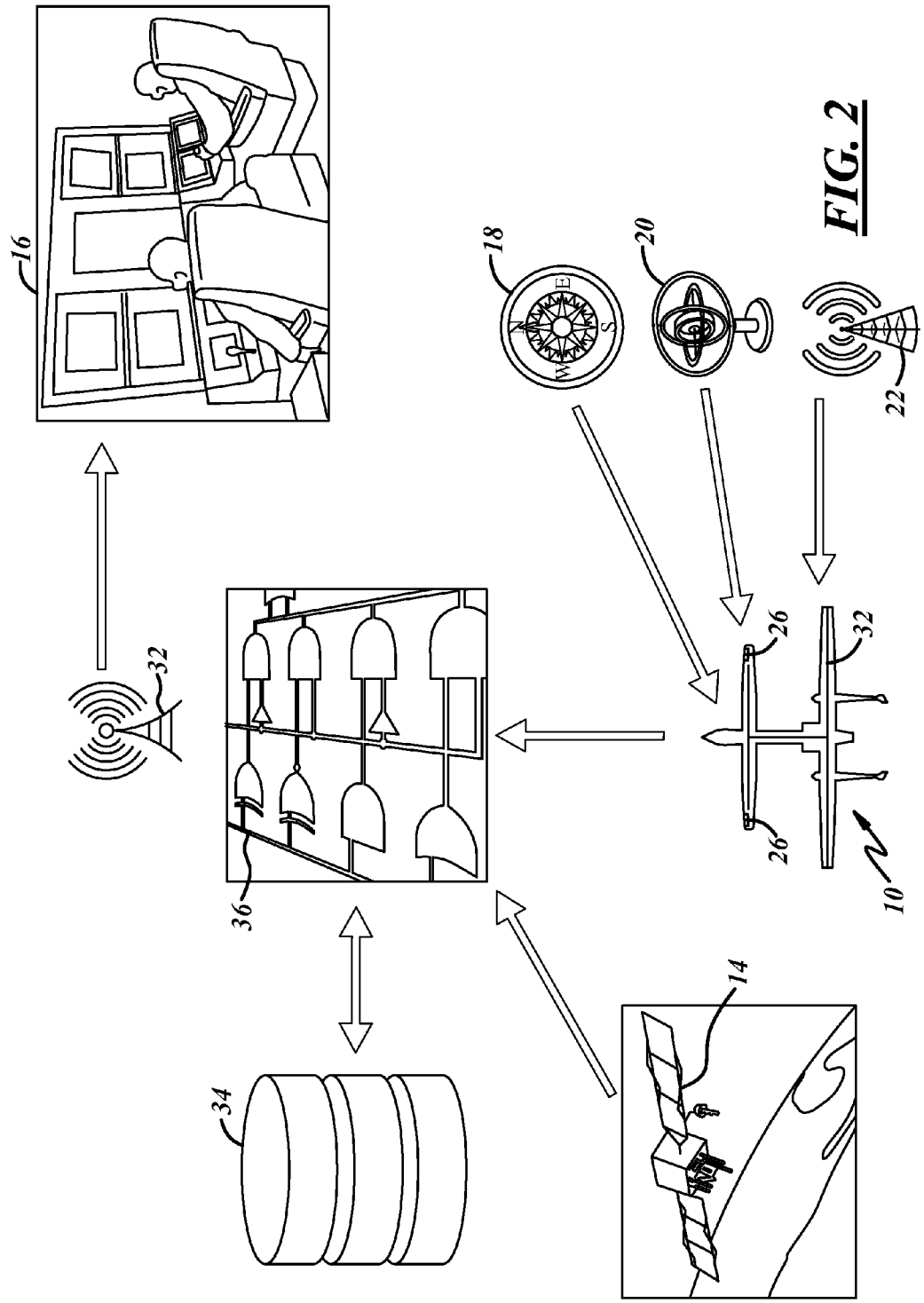
FIG. 2 is a block diagram of the operation of a method for determining a physical location of a vehicle.

Referring to FIG. 2, a redundant system passively checks the location of the UAV 10 and compares it to the data being received by the GPS 14. As is graphically represented in FIG. 2, the UAV 10 receives data in the form of electrical signals from an onboard compass 18, a three-axis gyroscope 20, and ground based radio transmitters 22. Sources of electrical signals may also include the ground based radio transmitters 22, which may provide a plurality of electromagnetic radiation signals from a plurality of spectral ranges. The spectral ranges are broadband and encompass multiple spectral ranges.

This list is not exhaustive and one skilled in the art may include other or additional inputs into the system utilizing the inventive method. In addition, ground based radio transmitters 22 include, but are not limited to, television broadcast signals, radio broadcast signals, cell tower transmitters, and the like.

Figure 1:
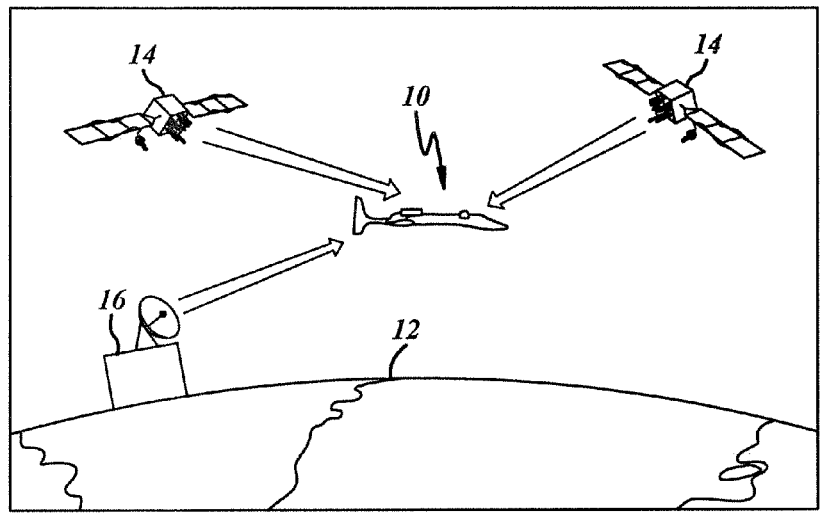
FIG. 1 is a perspective view of an Unmanned Air Vehicle being controlled by GPS.
Figure 3:
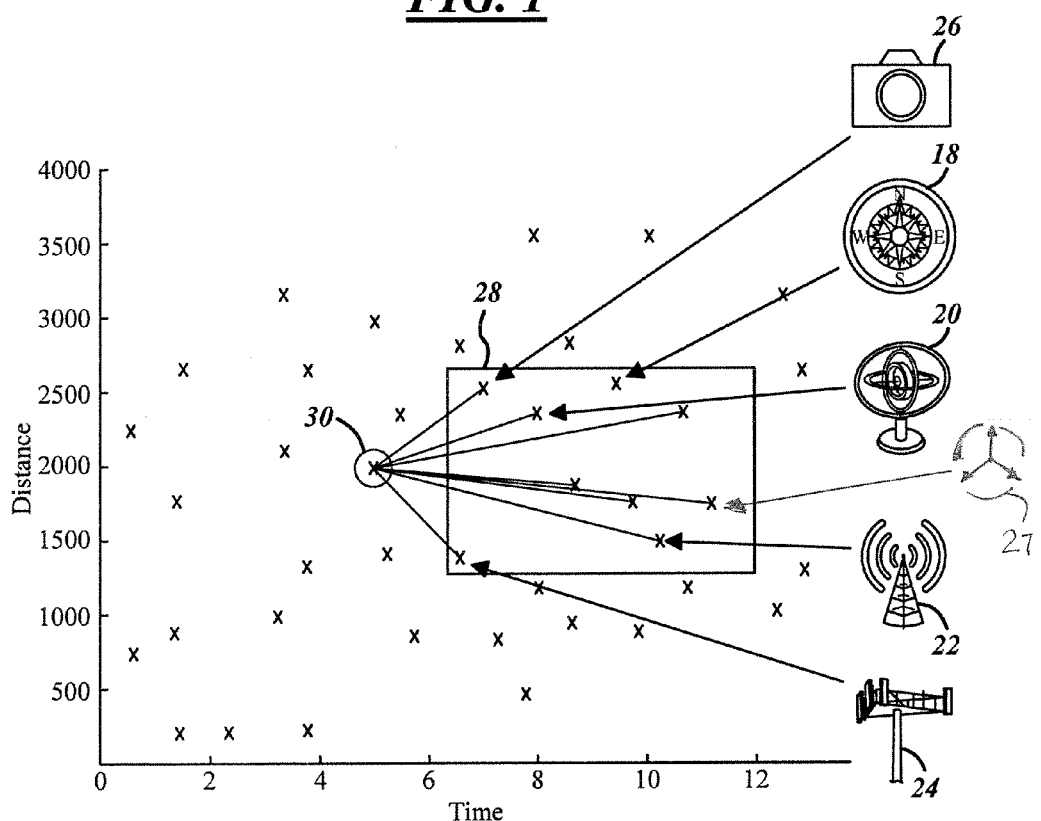
FIG. 3 is a constellation map of data used by the method.

In FIG. 3, the compass 18, three-axis gyroscope 20, and ground based radio transmitters 22 are graphically represented. In addition, a microwave transmitting tower 24 is also shown to provide an input, although this may also be categorized with the generally ground based radio transmitter 22. An additional input of visual data is illustrated in FIG. 3 graphically by a camera 26, which may operate as an onboard ambient light sensor. All of the data provided by each of these input devices 18, 20, 22, 24, 26 help define a target zone 28. Using the data located within the target zone 28, an anchor point 30 may be identified as the position of the UAV 10. In other words, by using the inventive method, the system may use combinatorial hashing using the inputs collected by the input devices 18, 20, 22, 24, 26 to identify the anchor point 30, which is the location of the UAV 10. This is done independently of the primary navigational system, the GPS 14.

In the instance of using optical data from the camera 26, one embodiment may include the use of at least two cameras, presumably one at either end of a wing tip of the UAV 10. Using Euclidean geometry, one could calculate the distance between the UAV 10 and an object which is at the focal point of both cameras 26. Use of the cameras 26 and an antennae system 32 onboard the UAV 10 is also used to identify the direction and location of the UAV 10 by collecting the combinatorial hash in a manner that allows the vector hash to be compared to positional data stored in an ephemerid location data base 34 on board the UAV 10. Through the use of combinatorial hashing, graphically represented by logic circuit 36, a calculation may be made using the ephemerides to determine a particular location and direction in which the UAV 10 currently is operating. By use of combinatorial hashing 36, the ephemerid information will be automatically reviewed quickly and accurately to identify the location and direction of the UAV 10. In many or most instances, the combinatorial hashing will occur in parallel calculations due to the different types of ephemerides available for the calculation. By way of example only, data from a camera system 26 could be used to identify a general location of a UAV 10 independently of that information which is received by the antennae system 32, which receives broadcast information from ground based radio transmitters 22 and microwave transmitting towers 24. Once all of the data is collected and the computation hashing is completed, a location and direction of the UAV 10 is available.

Figure 4:
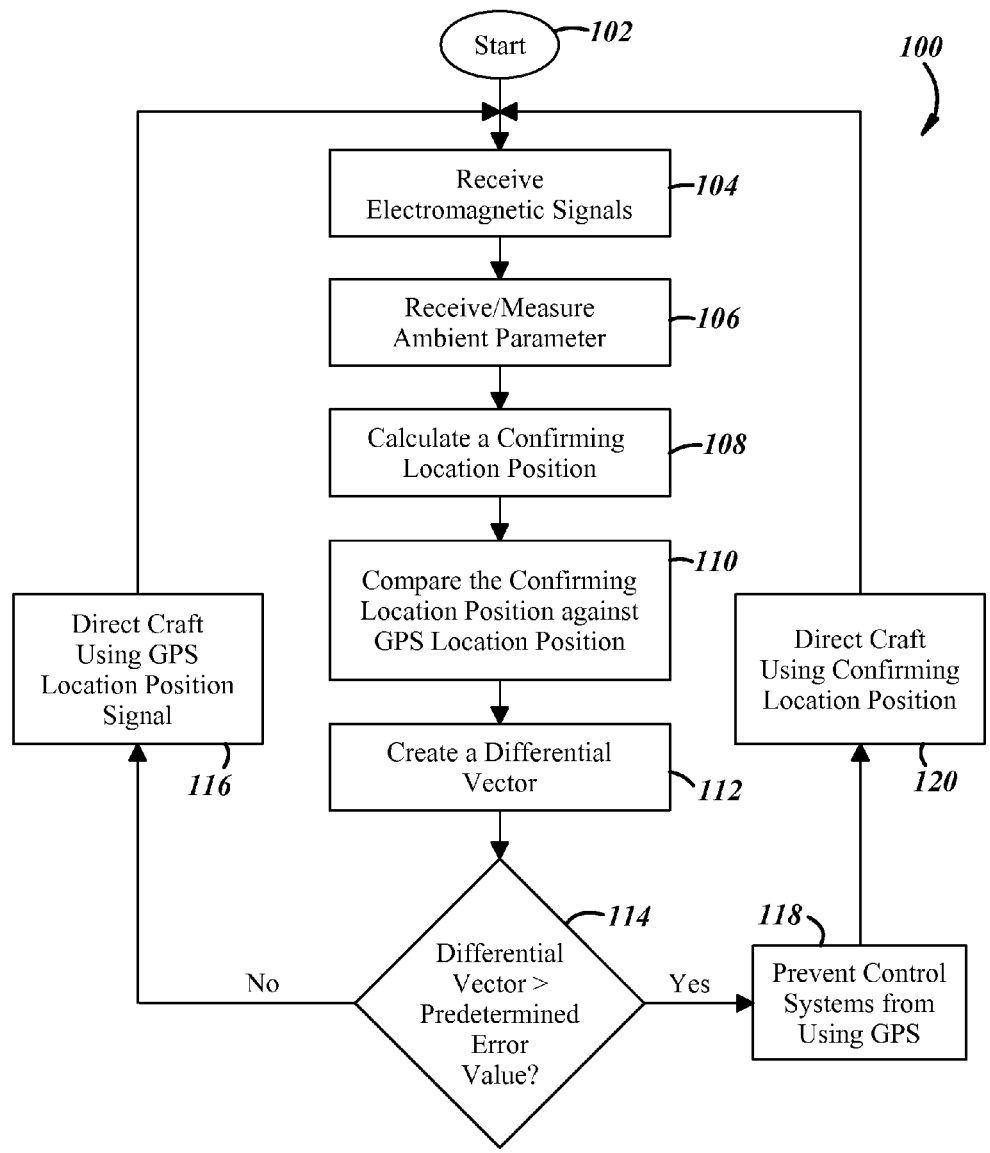
FIG. 4 is a flow or logic chart of one embodiment of the method.

Referring to FIG. 4, the inventive method is generally indicated at 100. The method starts at 102. Electromagnetic signals from ground based radio transmitters 22 and microwave transmitting towers 24 are received at 104. Ideally, three of these electromagnetic signals are received. Ambient parameters are received and/or measured at 106. Ambient parameters include the data collected by the cameras 26. In addition, data received from the onboard compass 18, an onboard three-axis gyroscope 20, and an onboard accelerometer 21 may be collected and used at this time period. Additionally, a very important piece of information is the time of day which would be collected independently of any navigational system and further refine the combinatorial hash function.

From the collected data and signals, a confirming location position is calculated at 108. The calculation is made by comparing the data collected with positional information stored in the data base 34. As stated above, to ensure the accurate and quick calculation, the use of combinatorial hashing 36 is employed.

Once the confirming location position is calculated, the confirming location position is compared against the GPS location at 110. A differential vector is created at 112. The differential vector compares the location and direction of the confirming location position against the location and direction as identified by the GPS location position. The antennae system 32 transmits the differential vector to the ground command base 16. If the differential vector is greater than a predetermined air value, a calculation done at 114 in FIG. 4, it is determined how to continue operation of UAV 10. If the differential vector is not greater than the predetermined air value, the UAV 10 continues to be operated using the GPS location position signal it traditionally receives from the GPS 14. If, however, the differential vector is greater than a predetermined value, signals from the ground command base 16 back to the UAV 10 prevent the UAV 10 from being controlled through the use of signals received by the GPS 14. The ground command base will instruct the UAV 10 to operate its directional functions based on the confirming location position at 120. The method then loops back and collects the information again and will operate the UAV 10 using the confirming location position 120 until the differential vector is less than a predetermined air value.

By use of the method 100, the UAV 10 may be manually controlled independently of its primary navigational system, the GPS 14, which will allow the UAV 10 to operate without being interfered with by sources external the designed operational sources.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A method for determining a physical location of a vehicle being guided with an onboard navigational positioning system capable of generating a location vector for a vehicle, the method comprising the steps of:
   receiving a plurality of electrical signals;
   calculating a confirming location position from the plurality of electrical signals;
   calculating a position differential by comparing the confirming location position to a location vector; and
   preventing use of the location vector in directing movement of the vehicle until the position differential is below a predetermined error value.

2. A method as set forth in claim 1 wherein the plurality of electrical signals includes a plurality of electromagnetic radiation signals.

3. A method as set forth in claim 2 wherein the plurality of electrical signals further includes a plurality of ambient parameter measurements.

4. A method as set forth in claim 3 wherein each signal of the plurality of electromagnetic radiation signals is from a plurality of spectral ranges.

5. A method as set forth in claim 4 wherein the spectral ranges are broadband and encompass multiple spectral ranges.

6. A method as set forth in claim 3 including the step of determining the location and direction of the vehicle by matching the confirming location vector to ephemeris data.

7. A method as set forth in claim 6 wherein the step of comparing includes combinatorial hashing of the ambient parameter measurements.

8. A method as set forth in claim 7 wherein step of comparing includes the use of ephemeris data.

9. A method as set forth in claim 8 including the use of an onboard digital compass.

10. A method as set forth in claim 8 including the use of an onboard three-axis gyroscope.

11. A method as set forth in claim 8 including the use of an onboard accelerometer.

12. A method as set forth in claim 8 including the use of an onboard ambient light sensor.

13. A method as set forth in claim 1 including the step of repeating the step of comparing the confirming location position to the GPS location position throughout a time period the vehicle is moving.

14. A method as set forth in claim 12 wherein each signal of the plurality of electromagnetic radiation signals is from a plurality of spectral ranges.

15. A method as set forth in claim 13 wherein the spectral ranges are broadband and encompass multiple spectral ranges.

16. A method as set forth in claim 12 including the step of determining the location and direction of the vehicle by matching the confirming location vector to ephemeris data.

17. A method as set forth in claim 14 wherein the step of comparing includes combinatorial hashing of the ambient parameter measurements.

18. A method as set forth in claim 15 wherein step of comparing includes the use of ephemeris data.

19. A method as set forth in claim 16 including the use of an onboard digital compass.

20. A method for determining a physical location of a vehicle being guided with an onboard navigational positioning system capable of generating a location vector for a vehicle, the method comprising the steps of:
   receiving a plurality of electromagnetic radiation signals;
   receiving a plurality of ambient parameter measurements;
   measuring the time at which each of the plurality of ambient parameter measurements are made;
   calculating a confirming location position from the time measurement, the plurality of electromagnetic radiation signals and the plurality of ambient parameter measurements;
   creating a differential vector by comparing the confirming location position to a location vector; and
   preventing use of the onboard navigational positioning system in directing movement of the vehicle until the differential vector is below a predetermined error value.

* * * * *